Figure 4:
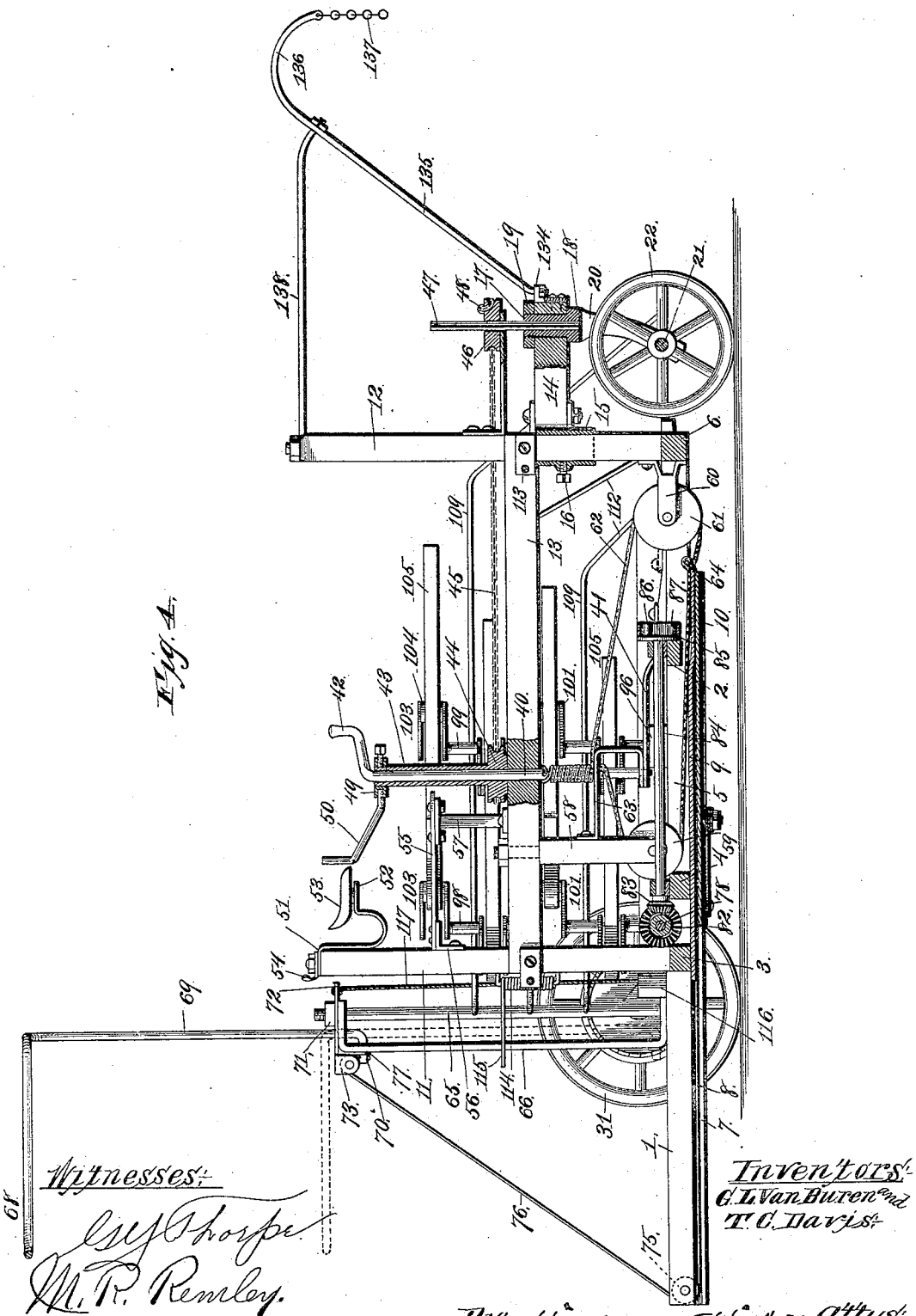

(No Model.) 5 Sheets—Sheet 1.
G. L. VAN BUREN & T. C. DAVIS.
CORN HARVESTER.
No. 529,431. Patented Nov. 20, 1894.
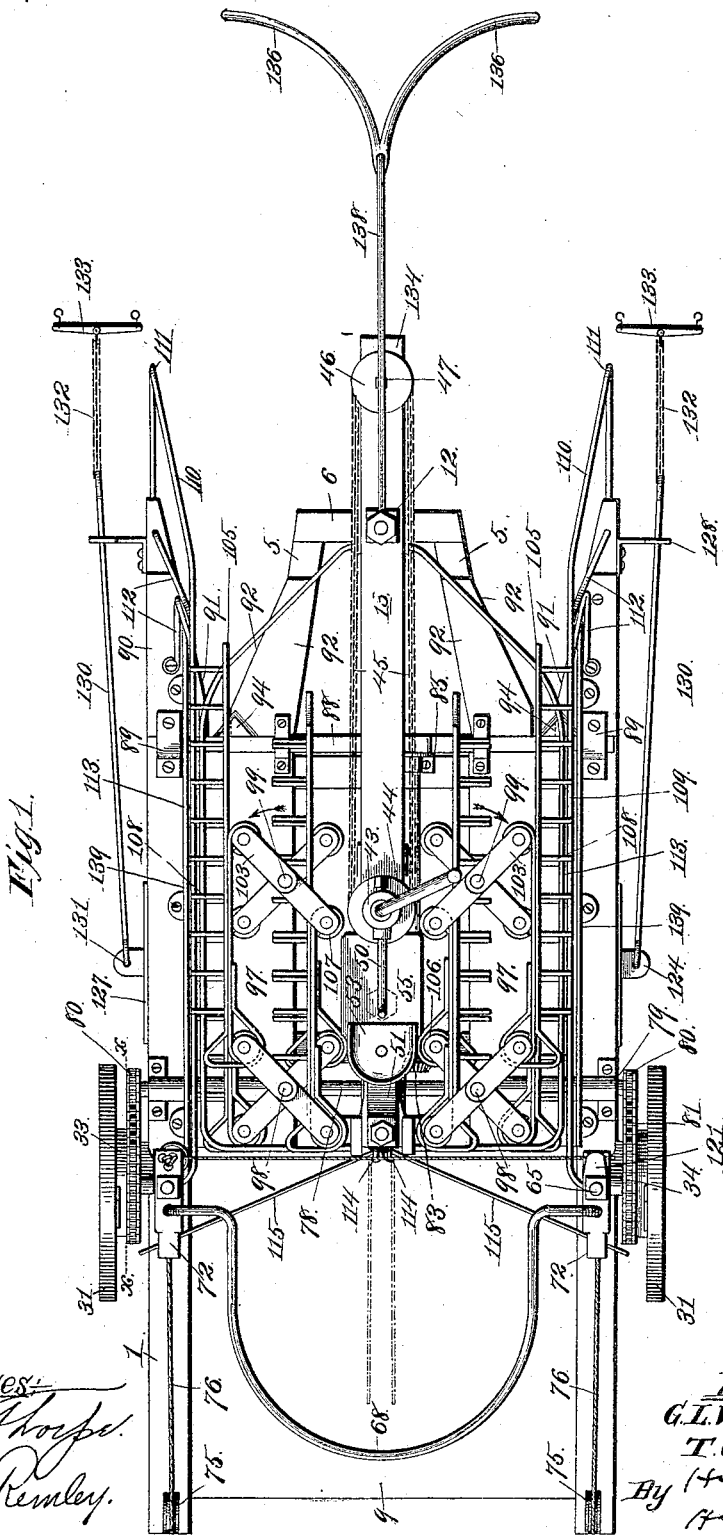
Witnesses:
Inventors:
G. L. Van Buren and
T. C. Davis (No Model.) 5 Sheets—Sheet 2.
G. L. VAN BUREN & T. C. DAVIS.
CORN HARVESTER.
No. 529,431. Patented Nov. 20, 1894.
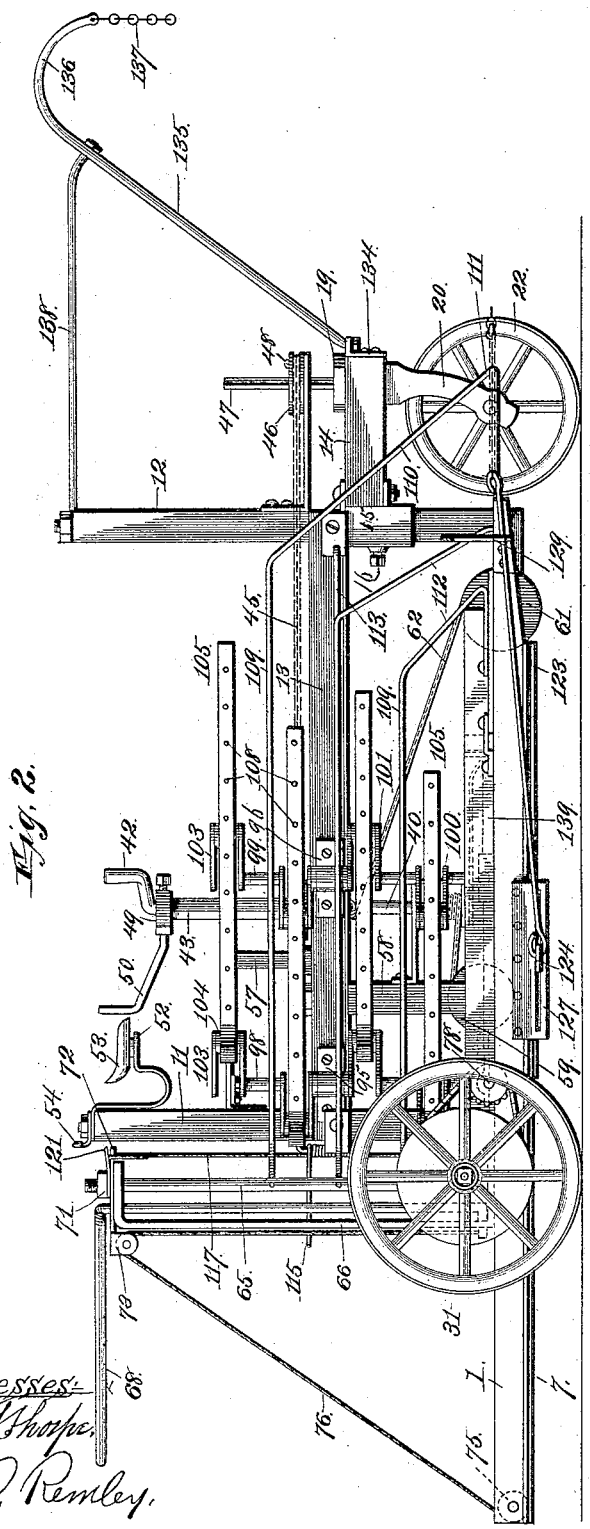

(No Model.) 5 Sheets—Sheet 3.
G. L. VAN BUREN & T. C. DAVIS.
CORN HARVESTER.
No. 529,431. Patented Nov. 20, 1894.
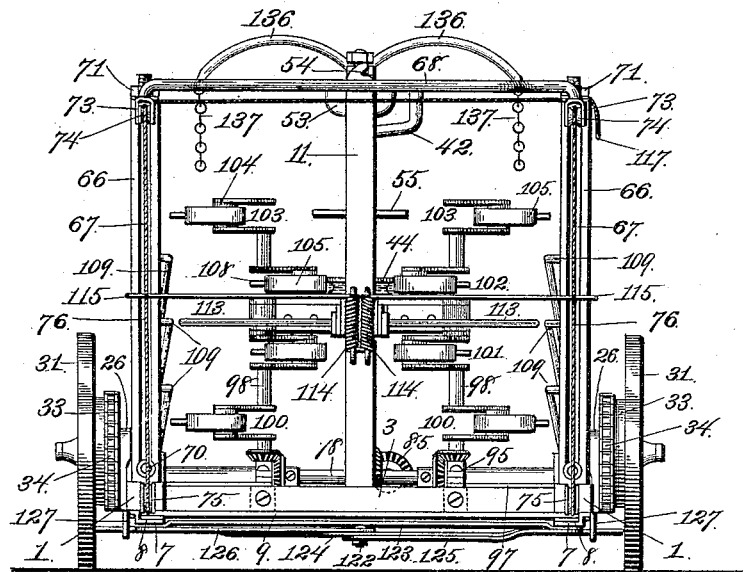
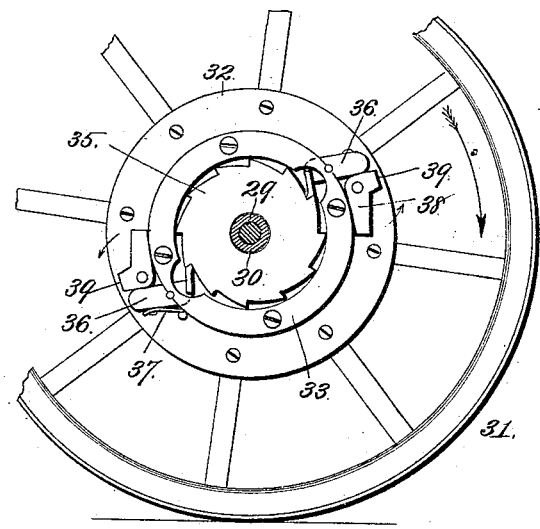
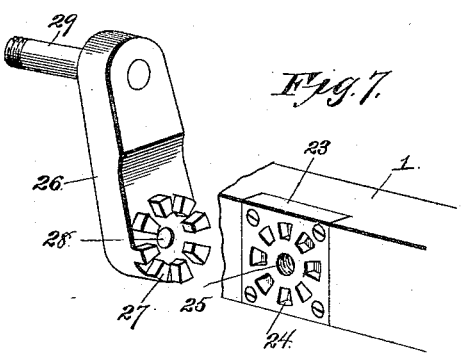
Witnesses:
Inventors:
G. L. Van Buren and
T. C. Davis,
By Higdon & Higdon
Attys.

(No Model.) 5 Sheets—Sheet 4.

G. L. VAN BUREN & T. C. DAVIS.
CORN HARVESTER.

No. 529,431. Patented Nov. 20, 1894.

Witnesses:
C. J. Thorpe
M. R. Remley

Inventors:
G. L. Van Buren and
T. C. Davis
By Higdon & Higdon Attys.

(No Model.) 5 Sheets—Sheet 5.
G. L. VAN BUREN & T. C. DAVIS.
CORN HARVESTER.
No. 529,431. Patented Nov. 20, 1894.
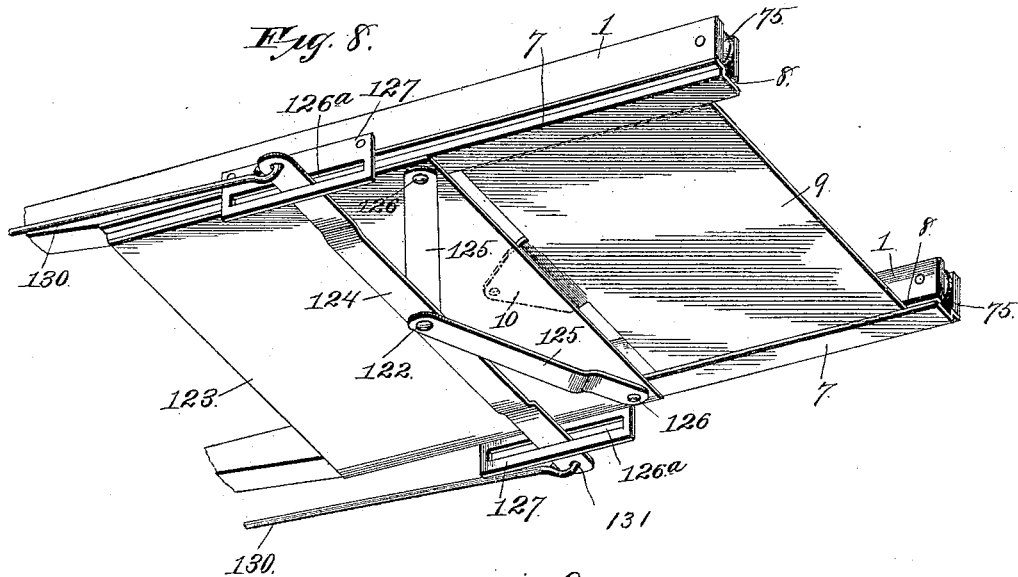
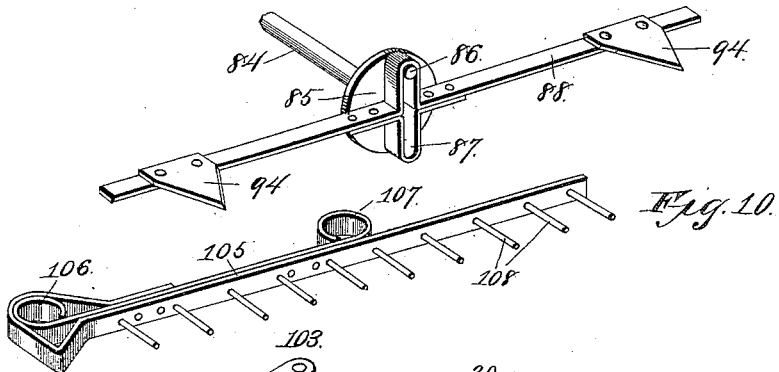
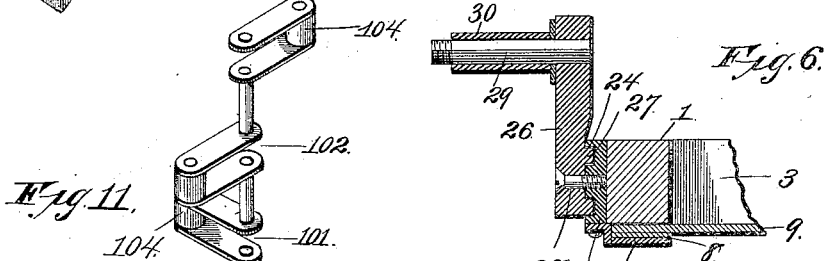
Witnesses:
C. A. Thorpe.
M. R. Remley.
Inventors:
G. L. Van Buren and
T. C. Davis,
By Higdon & Higdon
Attys.

UNITED STATES PATENT OFFICE.

GEORGE L. VAN BUREN AND THOMAS CLARK DAVIS, OF BENEDICT, KANSAS.

CORN-HARVESTER.

SPECIFICATION forming part of Letters Patent No. 529,431, dated November 20, 1894.

Application filed March 17, 1894. Serial No. 503,993. (No model.)

*To all whom it may concern:*

Be it known that we, GEORGE L. VAN BUREN and THOMAS CLARK DAVIS, of Benedict, county of Wilson, State of Kansas, have invented certain new and useful Improvements in Corn-Harvesters, of which the following is a full, clear, and exact description, reference being had to the accompanying drawings, forming a part hereof.

Our invention relates to corn-harvesters, and has for its objects, to produce a machine of this character, which, first, will cut, and automatically and reliably gather the corn at the rear end of the machine in a vertical or approximately vertical position, and in compact form, and with a cord engaging the rear side of the same so that the driver may complete the shock by securing the ends of the cord together; secondly, to provide means for simultaneously sliding the sustaining platform from beneath the shock, so as to let the same drop to the ground, and raising vertically the gate (in which the shock is formed) from engagement with the shock, so that when the machine is moved forward the gate will move entirely over the shocked corn, and to move the sliding platform and gate back to their original position; thirdly, to provide improved means for changing the elevation of the rear end of the machine, and, fourthly, to provide improved means for throwing the machine in and out of gear.

With these and other objects in view, as hereinafter appear, the invention consists in certain peculiar and novel features of construction and combinations of parts, as hereinafter described and claimed.

In order that the invention may be fully understood, reference is to be had to the accompanying drawings, in which—

Figure 1. is a plan view of a corn harvester constructed in accordance with our invention. Fig. 2. is a side elevation of the same. Fig. 3. is an end view of the harvester, as viewed toward the rear. Fig. 4. is a vertical longitudinal sectional view. Fig. 5. is a vertical sectional view taken on the line $x-x$ of Fig. 1, and showing the same on an enlarged scale. Fig. 6. is a vertical sectional view of mechanism for changing the elevation of the rear end of the machine. Fig. 7. is a perspective view of the mechanism for changing the elevation of the rear end of the machine. Fig. 8. is a detail perspective view of the under side of a portion of the machine, to show clearly the draft equalizer. Fig. 9. is a detail perspective view of the cutter-bar, and the means for reciprocating the same. Fig. 10. is a detail perspective view of one of the feeding-arms. Fig. 11. is a detail perspective view of one of the crank shafts for operating said feeding-arms. Fig. 12. is a detail perspective view of the tension device of the binding cord.

In the said drawings, the supporting framework of the machine consists of longitudinal and parallel beams 1, which are oppositely disposed, and are connected together a suitable distance from their front ends by the cross-beam, and about midway between said cross-beam 2, and their rear end by a cross-beam 3. A cross-beam 4, also connects said side-beams 1, a suitable distance forward of the cross-beam 3, and supports a bearing for the mechanism hereinafter alluded to.

In order to form a solid and substantial framework, additional longitudinal beams 5, are arranged a suitable distance inward of and parallel with the side beams 1, and extending from the cross-beam 3 to the cross-beam 2; and these beams 5 then extend or converge forwardly, and are united at their front ends by the cross-beam 6. Angle-plates 7, are secured to the under side of the longitudinal side beams 1, and extend from the rear end of said beams to a point slightly in advance of the cross-beam 2. These angle-plates 7 are secured in such position or manner that the groove or space 8 is formed between each angle-plate and the adjacent or under side of its corresponding side-beam. A horizontal platform 9, when in its normal position, extends from a point adjacent to the rear end of the side-beams 1, to and beneath the cross-beam 3, and has its side-margins fitting in the oppositely disposed grooves 8, so as to slide therein, as hereinafter referred to, and this platform 9, is formed at its front end with the extension 10, the object of which is hereinafter explained. Rising vertically from and midway of the cross-beam 3, is a standard 11, and rising vertically from and midway of the cross-beam 6, is a standard 12, which is connected rigidly to the standard 11 by the horizontally and longitudinally extending center-beam 13. A short longitudinal beam 14 projects forwardly from the beam 12, and is carried by a tubular bracket 15, which is adjustably mounted upon the standard 12 below the beam 13, and is secured at any required point of vertical adjustment by set-screws 16. The beam 14, is provided near its front end with a cylindrical aperture in which is rotatably mounted the cylindrical casting 17, which is provided at its lower end with an enlargement 18, bearing against the under side of the beam 14. A retaining-nut 19, engages the upper end of this cylindrical casting, and depending from its lower end are parallel arms 20, which form a bearing for the shaft 21 of the front guide and supporting-wheel 22 of the machine. Secured by screws or other suitable means in the outer side of each longitudinal side-beam 1, and adjacent to the cross-beam 3, is a casting 23, and this casting is provided with notches 24, arranged in circular series, and with a central screw-threaded hole or aperture 25. A pair of arms 26, are provided at their inner sides and lower ends with a circular series of lugs or projections 27, which engage the recesses 24 of the castings 23. These arms are provided axially of the circular series of lugs with the cylindrical holes or apertures 28, through which extend the bolts 29, and engage the threaded apertures 25 of the castings 23. It will be apparent, from this construction, that when these bolts are screwed firmly home, it will be impossible to move the arms 26 outward and disengage them from the castings 23, and it will be further observed that when said screws are moved outward sufficiently said arms may be moved outward far enough to disengage the lugs 27 from the recesses 24, and may then be rotated in one direction or the other upon said bolt, and when the desired inclination of the arms is obtained they may be moved inwardly so that the lugs 27 shall re-engage the recesses 24, so that further rotatable movement shall be impossible, and by resecuring the bolts in position accidental displacement cannot take place. Projecting outwardly from the upper end of each arm is a bolt 29, and mounted thereon are wear-sleeves 30, upon which the rear wheels 31 are rotatably mounted. From the foregoing, it will be understood, by properly manipulating these arms 26 that the elevation of the rear end of the machine may be changed at will.

Secured concentrically to the inner side of each wheel in any suitable manner, is a plate 32, and projecting inwardly therefrom and secured permanently thereto, are circular rings or bands 33. Mounted loosely upon the cylindrical sleeves 30, are sprocket-wheels 34, and projecting outwardly from each sprocket-wheel, and formed integral therewith, preferably, is a ratchet-wheel 35; said ratchet-wheel fitting snugly within the ring or band 30. In order to operate the sprocket-wheels, which are connected to the operating mechanism of the machine, as hereinafter referred to, by the action of the drive-wheels 31, the pawls 36 are pivotally carried by the plates 32, and these pawls are actuated by springs 37, also carried by said plates 32, to engage the ratchet-wheels 35, as clearly shown in Fig. 5. When the pawls are in engagement with the ratchet-wheels, the rotation of the drive-wheels causes the operation of the sprocket-wheels, and in order to disengage said pawls from said ratchet-wheels, when the machine is traveling to and from the field and it is not desired to cause the operation of the cutting and feeding mechanism hereinbefore referred to, the levers 38, pivotally carried by the plates 32, are operated in the direction indicated by the arrows, Fig. 5, so as to cause the operation and disengagement of the pawls 36 from the ratchet-wheels 35, and in order to lock said pawls in their disengaged or inoperative position, the levers 38 are formed with the squared ends 39, which bear against the said pawls and lock them in such position, as will be readily understood. Extending vertically through the center-beam 13, is a shaft 40, which finds a bearing and support at its lower end in the bracket 41, which is secured at its forward end upon the transverse beam 2, and this shaft is bent to form a crank handle 42 at its upper end. A vertical sleeve 43 is rotatably mounted upon the shaft 40, and is formed at its lower end with a grooved pulley 44, which rests upon the upper side of the center-beam 13, and this grooved pulley is connected, through the medium of the chain 45, with the grooved pulley 46, mounted to revolve with and slide upon the squared shaft 47, projecting vertically upward from the cylindrical casting 17. The chain 45 is preferably secured to the pulley 46, as shown at 48, so as to prevent any possible chance for slipping upon the said pulley, when it is desired to operate the same, as hereinafter alluded to. Rigidly secured upon the upper end of the sleeve 43, by a set-screw or other suitable means, is a collar 49, and projecting outwardly from said collar and toward the rear when the machine is traveling in a straight line, is a handle 50. Secured upon the upper end of the standard 11, is a spring-plate 51, which projects forwardly from said plate, and carries pivotally upon the horizontal end portion 52, a seat 53.

That portion of the supporting spring 51 which is interposed between the seat and the standard 11, is bent downwardly in U-form, so as not to present an obstruction in the way of the driver when he shall face to the rear to complete the shock by tying the ends of the cord together, and secured rigidly upon the upper side of the plate 51, by the same retaining-nut which secures the said plate in position, is a second plate, which terminates at its rear end in a knife or cutting portion 54, the object of which is hereinafter explained.

A foot-platform 55 is supported horizontally and a suitable distance below the seat 53, by means of a bracket 56, secured to the front side of the standard 11, and a short standard or post 57, which is secured to and rises vertically from the upper side of the center-beam 13. Secured permanently to and depending vertically from the center-beam 13, a suitable distance in advance of the standard 11, is a beam 58, and rotatably mounted in the lower bifurcated end of the same is a grooved pulley 59. Projecting rearwardly from the standard 12 and the cross-beam 6, is a bracket 60, and rotatably carried by said bracket is a grooved pulley 61, which occupies the same vertical plane as the grooved pulley 59, and passing around the grooved pulleys 59 and 61, is a chain 62, which has its opposite ends engaging the shaft 40 above and below the horizontal arm 63 of a bracket secured at one end to the front side of the beam 58, and resting at its opposite end upon the bearing-bracket 51; one end passing around the said shaft in one direction, and the other end of the said chain passing around the shaft in the opposite direction. This chain is also permanently secured at 64, to the forward end of the extension 10 of the sliding-platform 9.

It will be apparent, from this construction, that the operation of the shaft 40 in the proper direction will pull the platform toward the front of the machine, as shown clearly in Fig. 4, and that by reversing the operation of the shaft the platform will be moved back to its original position. Secured vertically upon each side-beam 1, a slight distance rearward of the cross-beam 3, are standards 65, and arranged vertically a suitable distance rearward of each standard 65 is a bar 66, which is bent horizontally forward at its lower and upper ends, and is secured, respectively, to the side-beams 1 and the standards 65, and these bars are vertically slotted, as shown at 67, and are also provided with an opening through their horizontal upper ends. A shocking-gate comprises the approximately semicircular and horizontally arranged portion 68, and the depending vertical arms 69, which engage the openings in the upper horizontal ends of the bars 66, and terminate at their lower ends in the rearwardly projecting and horizontal portions 70, which project through the vertical slots 67 of said bars. Secured upon the upper horizontal ends of said bars 66 by means of retaining-nuts 71, engaging the upper threaded ends of the standards 65, are longitudinally extending plates 72, terminating at their rear ends in the depending and oppositely disposed ears 73, between each pair of which is journaled a grooved pulley 74. A grooved pulley 75 is also rotatably mounted in the bifurcated rear end of each side-beam 1, and passing around said pulleys are cords or other flexible connections 76; the opposite ends of which are attached to the rear end of the sliding platform 9, and the rear end of the projecting portions 70, of the shocking-gate 68.

In order to insure the absolutely vertical rise and fall of the shocking-gate, as hereinafter referred to, collars or plates 77 are secured upon the projecting portions 70, and bear against the rear sides of the vertical guide-bars 66.

From the above description, it will be apparent that the driver, grasping the crank-handle 42, and operating the shaft 40 so as to move the platform 9 forward, will also, and at the same time, cause the shocking-gate to be moved vertically upward, as shown in full lines, Fig. 4, and that when the movement of the shaft 40 is reversed to move the platform back to its original position, the shocking-gate will, by gravity, descend also to its original position.

The following description relates to means for operating the cutting mechanism and the feeding arms or bars. The shaft 78, extends transversely of the machine a slight distance forward of the standard 11, and is journaled in bearings 79, secured upon the side-beams 1, and mounted rigidly upon the opposite ends of the said shaft, are small sprocket-wheels 80, which are connected, through the medium of chains 81, with the large sprocket-wheels 34, above alluded to. Mounted rigidly upon the shaft 78, about midway its length, is a beveled gear-wheel 82, and this gear-wheel meshes continually with the beveled pinion 83, mounted upon the rear end of the longitudinally extending shaft 84, which finds a bearing in the boxings upon the transverse beams 4 and 2, at its rear and front ends, respectively, and mounted rigidly upon the front end of said shaft 84, is a disk 85, from the front side of which projects a wrist-pin 86, which engages the vertical slot 87 in the transversely extending bar 88, which is retained in its horizontal position by guide bearing-plates 89, which are secured upon the side-beams 1 near their front ends, and upon the outer side of the outer cutting plates 90, which are secured to the upper side of the standards near their front ends; the cutting surface or edge of said knives extending rearwardly and inwardly as shown at 91. The companion and oppositely disposed cutting-plates 92, are mounted upon the converging portions of the longitudinal beams 5, and the cutting surfaces 93 of the plates 92 converge rearwardly toward the companion plates 90, as shown clearly in Fig. 1. The cutter-bar 88 carries near each end a cutting tooth 94, which, in operation, reciprocate across the inner ends of the cutting surfaces of their respective stationary cutting-plates 90 and 92, and are adapted, in conjunction with said plates, to cut or sever the stalks of corn. Journaled vertically in bearing-boxes 95 and 96, which are supported upon the stationary platforms 97, of the machine, which extend from the cross-bar 3 to the cross-bar 2, and from the inner margin of the side-beams 1, a little more than half way toward the center of the machine, are vertical shafts 98, and 99, respectively, which are each provided with four crank-sections 100, 101, 102, and 103; the two uppermost crank-sections projecting in diametrically opposite directions, and the two lower sections projecting also in opposite directions, and at right angles to the direction of the upper sections, and mounted rotatably in the outer end of each crank-section, is a vertical anti-friction roller 104.

Extending longitudinally of the machine, is a series of bars 105, which are provided with circular bearings 106 and 107, engaging, respectively, the anti-friction rollers 104 of the shafts 98 and 99, and projecting horizontally from the outer side of said bars are teeth or fingers 108, which are adapted, as hereinafter explained, to engage and convey the corn from the front to the rear end of the machine. The two uppermost of these bars 105, are preferably of greater length than the lower bars, the object of which appears in the description of the operation of the machine. Arranged a suitable distance apart, and secured at their rear ends to each vertical standard 65, is a series of guide or guard rods 109; the uppermost of said rods being bent, a suitable distance in advance of the cutter-bar, downwardly and outwardly, as shown at 110, and is then bent at 111 in the plane of the upper side of, and has its end brought back and secured to the forward end of the side-beam. The remaining rods 109 are also bent downwardly and outwardly, as shown at 112, and are secured to the side-beams 1, as shown, or in any other suitable manner. The inner guard or guide rod 113, is arranged a slight distance inward of and parrallel with the outer guard rods 109, and these inner guard rods are curved inwardly, and then extend transversely of the machine, and have their ends secured to the plates carried by the vertical standard 11, and these inner guard rods converge forwardly at their front ends, and are secured to plates carried by the center-beam 13, at its front end.

It has been found advantageous, in the practical operation of the machine, to employ these inner guard-rods in connection or combination with the outer guard-rods, because they insure a steady and uniform feed of the corn as it is carried to the rear of the feeding mechanism; said guard-rods conjointly preventing the bunching of the corn, and also tending to support it in a vertical position.

Secured to the rear side of the vertical standard 11, as shown, or in any other suitable manner, are the vertically arranged springs 114, and projecting rearwardly and outwardly from each of said springs is an arm 115, which bears against the rear side of the vertical guide-bar 66, at the corresponding side of the machine, so as to prevent any corn from entering the gate until it has first overcome the resistance of said spring arms and bent them longitudinally to the rear, as shown in dotted lines in Fig. 1.

Secured in any suitable manner upon one of the side-beams 1 of the machine, and forward of the corresponding standard 65, is a twine receptacle 116, and extending vertically upward from the ball of twine kept always within said receptacle, is the strand 117. A tension device for the twine comprises the apertures 118, 119 and 120, in the forward end of the plate 72, and the strand 117 is carried up through the aperture 118, thence downward through the aperture 119 and upward through the aperture 120, and downward through the aperture 118. It is then carried transversely and horizontally of the machine, and wedged adjacent to its free end between the upper side of the corresponding plate 72 and the spring clamping-plate 121, which is secured upon said plate 72. Pivotally secured upon the bolt 122, arranged below the bottom plate 123, (which connects the side-beams together from the front margin of the sliding platform 9, when occupying the rear portion of the grooves 8,) is the transversely extending equalizing-bar 124, and pivotally mounted at their front ends upon the bolt 122, are rearwardly divergent levers 125, which are pivotally mounted upon bolts 126, depending from the stationary platform 123. adjacent to its rear corners. The outer ends of the transverse equalizing-bar, 124 engage the longitudinal guide-slots 126ª of the brackets 127, depending from and carried by the side-beams 1.

Projecting outwardly from each side-beam 1, adjacent to its front end, is a bracket 128, and extending longitudinally of the machine and through the vertical slots 129 of said brackets, are draft-rods 130, which are pivotally mounted to work in a vertical plane at their rear ends to the projecting outer ends of the transverse bar 124 of the equalizer, as shown at 131, and connected to the forward end of said draft-rods are chains 132, provided with single-trees 133, at their front end, to which the draft-animals may be attached. By this construction, it will be seen that the strain upon the draft-animals is equalized, and that the equalizer, being located below the stationary bottom-plate 123, is entirely out of the way of the operating mechanism. Projecting forwardly and upwardly from and secured to a bracket 134, secured to the front end of the adjustable beam 14, is a rod 135, which is forked at its upper end to form the arms 136, which curve laterally and downwardly, and carry chains 137, to be attached to the draft-animals, and in order to hold this rod 135, rigidly in its central position, a brace-rod 138, connects it to the upper end of the standard 12.

The practical operation of the machine is as follows: After the drive-wheels are thrown in gear with the main actuating-shaft 78, by the proper operation of the pawls 36, as the machine is drawn forward the space between each pair of cutting knives, of course, being in longitudinal alignment with a row of corn, the vertical shafts 98 and 99 begin to rotate in the direction of the arrows, Fig. 1, and the uppermost feeding-arms, being of greater length than the lower feeding arms, as above alluded to, grasp the upper portion of the corn before it is cut, and draw it between the outer and inner spring guide-rods, and immediately after it reaches this position it is severed by the cutting knives 94 of the reciprocating cutter-bar 88. Immediately after it is cut the feeding-arm third from the top also grasps the corn, so that it shall have no opportunity to topple or lean out of the perpendicular, and after the said feeding-arm engages the corn, the feeding-arms located above and below the said feeding-arm successively grasp the corn in the operation of the shafts 98 and 99, and move it bodily to the rear, and to prevent any possible chance of the lateral displacement of the corn at its lower end, the vertically and longitudinally extending guard-plates 139 are provided; these guard-plates being located at the inner margin of the side-beams 1, and extending from the transverse bar 3 a suitable distance forward of the transverse bar 2. The corn is discharged in a vertical position at the rear or outlet end of the spring guard-rods and against the front side of the transversely extending strand or cord 117, and as the corn is accumulated upon the platform at this point, it causes the cord to yield at its tension point until said corn is supported, still in a vertical position, against the front side of the spring arms 115. These spring arms are adapted to hold the corn cut from a few hills, because, should the corn be fed into the gate in insufficient quantities it would fall over, and possibly miss the gate altogether. After a considerable quantity of corn is gathered, the pressure of the spring-arms 115 is overcome, and the corn moves rearward and into the gate; the spring-arms being forced to the position shown in dotted lines, Fig. 1. After the quantity of corn desired to shock is set vertically in the gate, the driver stops the machine, and pivotally operating the seat 53, faces to the rear, and grasping the end of the cord, releases it from the clamp, and also draws a sufficient length through the tension device to completely encircle the corn, and cuts the cord on the stationary knife 54. He then secures the ends of the cord together, and thus completes the shock. It will be apparent that by forming the seat-supporting spring with the depending U-portion, it will not present any obstruction in the way of the driver when he turns the seat, as he may easily throw one foot over the said spring. The shock being completed, the driver operates the vertical shaft 40, and simultaneously slides the platform 9 from beneath the corn and elevates the gate; thus allowing the corn to settle or drop upon the ground in an upright position. The driver now starts the machine forward to withdraw the spring-arms from the shock, and reverses the operation of the shaft 40 to cause the platform 9 and the gate to resume their original position. The succeeding operations are repetitions of the one described.

From the above description, it will be apparent that we have produced a corn-harvester which is positive and reliable in operation, and comparatively simple and inexpensive of construction.

Having thus described our invention, what we claim as new, and desire to secure by Letters Patent, is—

1. In a corn harvester, the combination with a cutting and feeding mechanism, of a sliding platform at the rear or discharge end of the feeding mechanism, a gate also carried at the rear or discharge end of the feeding mechanism, and means to simultaneously slide the platform forward and elevate or raise said gate, substantially as set forth.

2. In a corn harvester, the combination with a suitable wheel-supported framework, comprising parallel side-beams provided with longitudinal grooves, and a platform connecting the front portions of the side-beams, of a feeding mechanism mounted upon the said platform, a cutting mechanism mounted at the front end of the platform, a second platform mounted slidingly in the grooves of the said side-beams and at the rear end of the first-mentioned or stationary platform, a shaft having a crank-handle, and mounted over the stationary platform, guide-pulleys mounted in the framework, and a cable engaging said guide-pulleys and the sliding platform, and attached at its opposite ends to the said shaft, substantially as set forth.

3. In a corn harvester, the combination with a cutting and feeding mechanism, and a platform located at the rear or discharge end of said feeding mechanism, of a movable shocking-gate, guide-pulleys, flexible connections extending around said guide-pulleys and attached at their opposite ends to the lower end of the shocking-gate and to the rear end of the platform, and means to move said platform forward so as to elevate the shocking-gate, substantially as set forth.

4. In a corn harvester, the combination with a slidable platform, and vertically slotted standards carried by the framework of the machine and at each side of said platform, and having guide openings in their upper ends, of a shocking-gate having depending arms extending vertically through the guide openings of said standards, and having horizontally-turned lower ends engaging said guide-slots, guide pulleys carried at the upper ends of said standards, and guide pulleys carried at the rear end of the frame-work of the machine, flexible connections passing around said guide-pulleys and connecting the lower horizontal portion of said gate and the rear end of the slidable platform, means to move the said platform and cause the elevation of the shocking-gate; the horizontal portions of which are guided vertically in the slotted standards, and means to cause the platform and the shocking-gate to resume their original positions, substantially as set forth.

5. In a corn harvester, the combination with a suitable framework, supported upon drivewheels near its rear end, a beam carried at the front end of the machine, a casting rotatably mounted in said beam, and carrying the front guide and supporting wheel of the machine, and a rod projecting vertically from said casting, of a pulley mounted upon said rod so as to slide thereon and rotate therewith, a second pulley rotatably mounted adjacent to the driver, a chain passing around said pulleys, and a handle connected to the pulley adjacent to the driver so that the same may be rotatably operated to turn the guide-wheel in one direction or the other, substantially as set forth.

6. In a corn harvester, the combination with a cutting and feeding mechanism, of a platform located at the rear end of the cutting and feeding mechanism, and a shocking-gate located above the said platform, twine extending transversely of the machine and interposed between the discharge end of the feeding mechanism and the receiving end of the shocking-gate, a knife located about midway and forward of the transversely extending twine, a seat, and a spring supporting said seat and supported by a standard of the machine, and bent to form the depending U-shaped portion between its connection with said standard and said seat, substantially as and for the purpose set forth.

In testimony whereof we affix our signatures in presence of two witnesses.

GEO. L. VAN BUREN.
THOMAS CLARK DAVIS.

Witnesses:
G. Y. THORPE,
M. R. REMLEY.